United States Patent
Gebauer et al.

(10) Patent No.: US 8,272,272 B2
(45) Date of Patent: Sep. 25, 2012

(54) PRESSURE MEASUREMENT MODULE

(75) Inventors: Jan Gebauer, Karlsruhe (DE); Masoud Habibi, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/812,732

(22) PCT Filed: Nov. 26, 2008

(86) PCT No.: PCT/EP2008/066198
§ 371 (c)(1),
(2), (4) Date: Oct. 1, 2010

(87) PCT Pub. No.: WO2009/089956
PCT Pub. Date: Jul. 23, 2009

(65) Prior Publication Data
US 2011/0016981 A1    Jan. 27, 2011

(30) Foreign Application Priority Data
Jan. 18, 2008    (DE) .......................... 10 2008 005 153

(51) Int. Cl.
*G01L 9/00* (2006.01)
(52) U.S. Cl. ........................ 73/753; 361/283.4; 73/754
(58) Field of Classification Search ............ 73/700–756
See application file for complete search history.

(56) References Cited

U.S. PATENT DOCUMENTS

| | | | |
|---|---|---|---|
| 5,859,759 A * | 1/1999 | Moriyama et al. | 361/283.4 |
| 6,805,010 B2 | 10/2004 | Kunht et al. | |
| 6,993,976 B2 | 2/2006 | Fessele et al. | |
| 7,426,868 B2 | 9/2008 | Fessele et al. | |
| 2007/0017294 A1 * | 1/2007 | Asada et al. | 73/754 |
| 2007/0193359 A1 * | 8/2007 | Asada et al. | 73/754 |
| 2008/0178681 A1 * | 7/2008 | Asada et al. | 73/754 |
| 2010/0212433 A1 * | 8/2010 | Hunziker et al. | 73/706 |
| 2011/0239772 A1 * | 10/2011 | Kurtz et al. | 73/721 |

FOREIGN PATENT DOCUMENTS

| | | |
|---|---|---|
| DE | 10054013 | 5/2002 |
| DE | 102004012593 | 9/2005 |
| JP | 6-235670 | 8/1994 |
| JP | 6-87840 | 12/1994 |
| JP | 7-151561 | 6/1995 |
| JP | 2000-329632 | 11/2000 |
| JP | 2003-149068 | 5/2003 |
| JP | 2007-501937 | 2/2007 |
| WO | WO 03/100371 | 12/2003 |

OTHER PUBLICATIONS

International Search Report, PCT International Patent Application No. PCT/EP2008/066198, dated Mar. 10, 2009.

* cited by examiner

*Primary Examiner* — Andre Allen
(74) *Attorney, Agent, or Firm* — Kenyon & Kenyon LLP

(57) ABSTRACT

A pressure measuring module for recording an absolute pressure or a relative pressure. Pressure measuring module includes a housing produced preferably as a premold, in which a pressure measuring chip is accommodated. The latter is contacted electrically either to a lead frame or to at least one printed circuit trace, at least one electronic component being provided, which is connected to a section of the lead frame or of the at least one printed circuit trace, exiting laterally from the housing that is produced as a premold, and is covered by a partition of a cover.

11 Claims, 2 Drawing Sheets

PRESSURE MEASUREMENT MODULE

BACKGROUND INFORMATION

German Patent Application No. DE 100 54 013 B4 relates to a pressure sensor module. This includes at least one module housing having a connecting piece in which an opening is situated for a medium that is to be measured. The pressure sensor module furthermore includes a pressure sensor, that is situated in a sensor housing, that is developed to be provided with a sensor housing opening and separately from the module housing, and is protected by a cover mounted on the pressure sensor in the sensor housing. The sensor housing lies in a recess of the module housing, at least partially against the module housing and is held in the recess by a plastic extrusion coating or a sealing compound. A part of the sensor housing surrounding the sensor housing opening lies against the module housing, so that the sensor housing opening completely encloses the opening of the connecting piece. The plastic extrusion coating or the sealing compound completely encloses the sensor housing in the recess except for the part of the sensor housing lying against the motor housing and the sensor housing opening.

German Patent Application No. DE 10 2004 012 593 A1 relates to a sensor module. The sensor module is especially a pressure sensor module having a sensor housing, which has a housing part having electrical conductors partially embedded in it. In the sensor housing, a first inner chamber is developed in which a sensor device is situated, and a second inner chamber is provided that is sealed from the first inner chamber. In the latter, there is at least one capacitor. In the first inner chamber there is an accommodation part having an accommodation formed by a surrounding wall, into which the sensor device is set, and is covered by a protective cover that is filled into the accommodation. The sensor device is contacted to electrical connecting elements situated at the accommodation part. The connecting elements are directly connected to connecting sections of the electrical conductors. The at least one capacitor situated in the second inner chamber is connected via an electrically conductive material to at least one of the electrical conductors.

For reasons of interference immunity (electromagnetic compatibility) and the resistance to electrostatic discharges (ESD), capacitors are required for sensors, for protection of the micromechanical silicon pressure measurement chips having an evaluation circuit. The silicon pressure measurement chips are usually designated as Si chips. One possibility is to integrate these capacitors into the Si chip. This requires, for one thing, a greater expenditure for chip surface, and thereby increases production costs of the chip, and for another thing, the integrated EMC capacitors usually do not fulfill the requirements with respect to the electrostatic discharges (ESD requirements), or do so only inadequately.

Therefore, in most cases, only the possibility remains of inserting the capacitors externally, that is, separately from the Si chip. These capacitors are generally inserted in the same chamber, that has pressure applied to it, as the Si chip, such as on the circuit carrier (hybrid, printed circuit board) or the lead frame. The last-named possibility has some disadvantages, such as the construction being less inflexible, since the capacitors cannot be placed at any optional place. This has the result, in turn, that the distance between the Si chip and the capacitors cannot be decreased at will, which is necessary, however, for optimizing the electromagnetic compatibility.

SUMMARY

According to an example embodiment of the present invention, a sensor module, especially a pressure sensor module having integrated capacitors is provided, in which, while using Si chips that are already present, the resistance to electromagnetic interference is increased and, at the same time, the construction of the whole sensor, especially of the pressure sensor, is maintained to be simpler and more flexible. In the construction of the pressure sensor module provided, it is considered important to deviate as little as possible from existing production concepts, that are already used in mass production and have proven themselves.

The construction provided according to the example embodiment of the present invention, of a pressure sensor module having integrated capacitors, has the advantages over the usually constructed variants that, compared to the variant of integrating the capacitors on the Si chip, a lower chip surface is created, and with that, lower chip costs. Chip-integrated capacitors represent only a compromise, and satisfy the ESD requirements placed on them inadequately or not at all. Lower individual parts costs are created in comparison to the development of a new Si chip.

The construction provided according to the example embodiment of the present invention has the advantages over the variant, in which the capacitors are adhered to the lead frame in a chamber that does not have pressure applied to it (two-chamber construction), that an improvement in the EMC is achieved by a substantially lesser distance prevails to the Si chip. More flexible construction variants of the sensor are possible, since no external capacitors are used. The process of putting on, adhering and curing is able to be considerably simplified in the production of the pressure sensor module provided according to the present invention, since setting, adhering and curing processes may be omitted. The second chamber present in a two-chamber construction of the pressure sensor module, which was used up to now for accommodating the capacitors, may be used for additional ESD/EMC protective measures. In the second chamber, one may mount, for example, varistors or other electronic components.

The capacitors mentioned, are premounted on the lead frame of the pressure sensor module using a suitable method, such as soldering, using conductive epoxy adhesives or by soldering and bonding. After that, extruding is performed using the housing material of the module, which does not represent an additional production step to be provided, but may take place within the scope of producing the module housing.

Alternatively, subsequent mounting of the two EMC capacitors on the lead frame may be carried out, using a suitable method, such as soldering, using conductive epoxy adhesives, or using soldering and bonding, in the finished module housing and using a subsequent passivating step, such as gelling or glueing.

In the last-named production variant, the EMC capacitors may also be mounted subsequently in the backfill region. A "backfill region" is the open recess at the back of the module housing, in which the at least one EMC capacitor is able to be mounted from the rear of the module housing.

The currently used construction of a pressure sensor module needs to be adjusted for this only minimally.

The construction obtained of the pressure sensor module provided according to the present invention has a clearly higher EMC, is flexible and may be installed without further circuit elements. When using the construction provided according to the example embodiment of the present invention, any desired pressure sensors for different applications may be constructed, which have all the abovementioned advantages compared to the design approaches used up to now, as will be shown below.

BRIEF DESCRIPTION OF THE DRAWINGS

Below, the present invention is explained in greater detail on the basis of descriptions of example embodiments and the figures.

DETAILED DESCRIPTION OF EXAMPLE EMBODIMENTS

Figure 1:
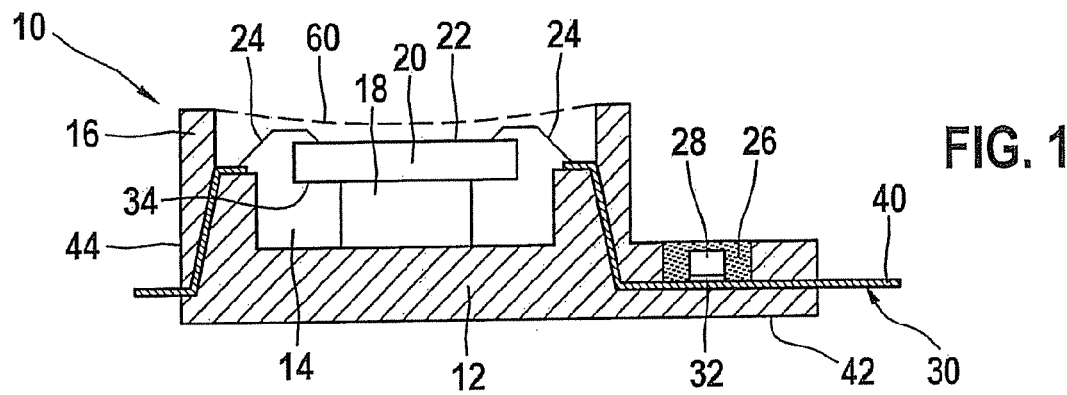
FIG. 1 shows the pressure measuring module, provided according to the present invention, for recording an absolute pressure.

FIG. 1 shows an example pressure measuring module 10 provided according to the present invention, which is able to be used for recording an absolute pressure.

FIG. 1 shows that pressure measuring module 10 has a housing 12, whose housing walls 16 border on an inner chamber 14. On the floor of inner chamber 14 there is a pedestal 18, on whose upper side a pressure measuring chip, particularly a silicon pressure measuring chip, is accommodated. Pressure measuring chip 20 has an upper plane surface 22 and a lower side 34. In housing 12 of pressure measuring module 10 there is a lead frame 30, for example, or a number of printed circuit traces 50 (cf. top view according to FIG. 4). Free ends of lead frame 30 or the number of printed circuit traces 50 open out into inner chamber 14 inside housing 12. Plane surface 22 of pressure measuring chip 20 is connected electrically to lead frame 30 or to the number of printed circuit traces 50 via bonding wires 24, depending to the specific embodiment variant.

As shown in FIG. 1, at least one EMC capacitor 28 is assigned to lead frame 30, according to this specific embodiment variant. The at least one EMC capacitor 28 is enclosed by a passivating medium 26 and is connected to lead frame 30 using a continuous material connection or an epoxy adhesive connection within the scope of a continuous material connection 32. As one may also see in the illustration according to FIG. 1, inner chamber 14 of pressure measuring module 10 is covered by a cover 60, which, however, permits the application of pressure to plane surface 22 of pressure measuring chip 20, and consequently makes possible the measurement of an absolute pressure.

Figure 4:
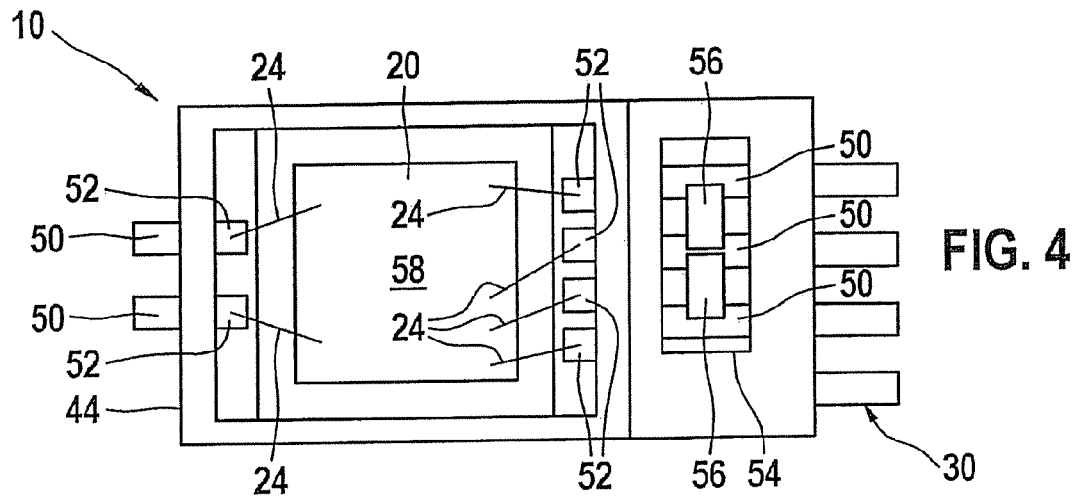
FIG. 4 shows a top view onto the pressure measuring module provided according to the present invention, having two EMC capacitors, which each contact two printed circuit traces of a lead frame electrically to each other.

Pressure measuring module 10, shown in sectional illustration in FIG. 1, may be produced, for example, in such a way that preassembly takes place of at least one capacitor 28 on lead frame 30 or of at least one capacitor 56, which contacts two printed circuit traces in bridging fashion (cf. FIG. 4). The preassembly of the at least one capacitor 28 or 56 preferably takes place by way of developing a continuous material connection, such as by soldering or using a conductive epoxy adhesive, or by soldering and bonding. In bonding, an electrical contact is produced by a thin bonding wire.

After preassembly of the at least one capacitor 28 or 56 on lead frame 30 or on the at least one printed circuit trace 50, there takes place an extruding of lead frame 30 using the material of which housing 12 is produced. This does not represent a separate process step, but rather the at least one capacitor 28 or 56 is able to be molded into housing 12 by the extrusion method that follows the preassembly.

Alternatively, pressure measuring module 10, shown in the illustration according to FIG. 1, may also be executed by a subsequent assembly of the at least one electronic component, such as an EMC capacitor 28, on lead frame 30 or on at least one printed circuit trace 50. The subsequent assembly takes place into a finished housing, the at least one electronic component 28 being able to be joined to the housing by developing a continuous material connection, such as by soldering or by glueing using a conductive epoxy adhesive, or by soldering and bonding. Following this, subsequently joined electronic component 28, such as at least one EMC capacitor, is able to be passivated. The passivating takes place by inserting a passivating medium, such as by gelling or glueing of a recess of housing 12, in which the at least one electronic component 28 is located in housing 12.

Figure 2:
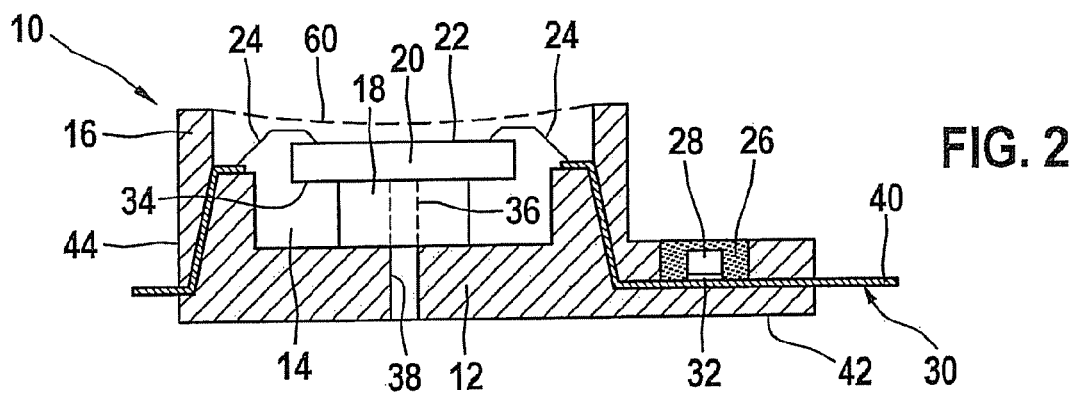
FIG. 2 shows a specific embodiment of the pressure measuring module, provided according to the present invention, for recording the relative pressure.

While the specific embodiment of pressure measuring module 10, provided according to the present invention, in the sectional representation in FIG. 1, is used for recording the absolute pressure, the recording of a relative pressure is able to take place via pressure measuring module 10 provided via the specific embodiment shown in FIG. 2.

By contrast to the specific embodiment according to FIG. 1, for this there are in each case passage channels 36, 38 in pedestal 18 as well as in the floor region of housing 12, below cavity 14. Via passage channels 36 and 38 in pedestal 18 and in housing 12 there takes place the pressure application of lower side 34 of pressure measuring chip 20, whose upper plane surface 22 has pressure applied to it via permeable cover 60. Analogously to the representation of the embodiment variant according to FIG. 1, housing 12 is provided with an inner chamber 14, within which pedestal 18 is located, along with pressure measuring chip 20 that is accommodated on its upper side. Free ends of lead frame 30 or of printed circuit traces 50, that make possible electrical contacting, project into inner chamber 14 of pressure measuring module 10 (cf. illustration according to FIG. 4). According to this specific embodiment, too, lead frame 30 has at least one electronic component 28, such as an EMC capacitor, which is passivated inside a passivating medium 26. The at least one electronic component in the form of at least one EMC capacitor 28 is connected by a continuous material connection, which is constituted as a soldered connection, for example, or by the use of a conductive epoxy adhesive to lead frame 30 or to at least one printed circuit trace 50.

In the illustration according to FIG. 2, one may also clearly see a bottom of housing 12 labeled 42 and an outer wall of housing 12 labeled 44.

Pressure measuring module 10 according to the illustration in FIG. 2 is produced, for instance, by preassembly of the at least one electronic component 28 on the lead frame or the at least one printed circuit trace 50. The preassembly is made by developing a continuous material connection between the at least one electronic component 28, which is preferably an EMC capacitor, and lead frame 30 or at least one printed circuit trace 50, by developing a continuous material connection, such as a soldering connection, or by developing a glued joint using a conductive epoxy adhesives or by soldering and bonding. After preassembly of the electronic components, which are constituted as EMC capacitors, for example, an extrusion is performed of lead frame 30 or the at least one printed circuit trace 50 and of electronic component 28, that is preferably an EMC capacitor, of which housing 12 of pressure measuring module 10 is made. This does not represent any process step that has to be separately carried out, but takes place within the scope of the actual production of pressure measuring module 10.

Alternatively, pressure measuring module 10 may be produced by having the subsequent mounting of the at least one electronic component 28, which is preferably an EMC capacitor, on lead frame 30 or the at least one printed circuit trace 50 take place by a continuous material joining method. Soldering or glueing using a conductive epoxy adhesive or soldering and bonding have been particularly successful as continuous material joining methods. The mounting of the at least one electromagnetic component in the form of an EMC capacitor 28 takes place subsequently in finished housing 12 of pressure measuring module 10. The subsequent mounting is followed by a passivating step in which a passivating medium 26 surrounds the at least one electronic component 28. The passivating of the at least one electronic component 28 preferably takes place by gelling or glueing.

Figure 3:
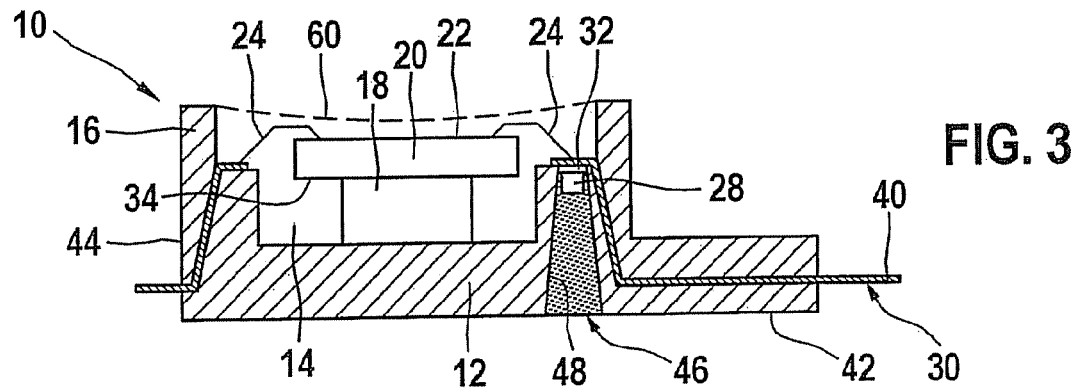
FIG. 3 shows a specific embodiment of the pressure measuring module provided according to the present invention, for recording the absolute pressure, at least one EMC capacitor being built in starting from the rear of the housing.

FIG. 3 shows a specific embodiment of the pressure measuring module, provided according to the present invention, for recording an absolute pressure using at least one electronic component that is mounted from the rear side of the housing.

As FIG. 3 shows, housing 12 of pressure measuring module 10 has a cavity 46, according to the specific embodiment in FIG. 3. Cavity 46 is accessible from rear side 42 of housing 12, and is bordered by sloping walls 48. After the production of housing 12, lead frame 30 as well as the at least one printed circuit trace 50 (cf. illustration according to FIG. 4) may be fitted retroactively through recess 46 with at least one electronic component, such as an EMC capacitor 28. This takes place from the rear side of housing 12. In this specific embodiment, too, the mounting of the at least one electronic component 28, which is preferably at least one EMC capacitor, takes place by generating a continuous material connection between the at least one electronic component 28 and lead frame 30 or the at least one printed circuit trace 50 by a soldering connection or by glueing using a conductive epoxy adhesive, to name some examples. A continuous material connection between the at least one electronic component 28 and lead frame 30 or the at least one printed circuit trace 50 may be accomplished by soldering in combination with a conductive adhesive, only by soldering, by soldering and bonding, or by using a conductive adhesive, such as a conductive epoxy adhesive.

In addition, one may see in FIG. 3 that a free end 40 of lead frame 30 or the at least one printed circuit trace 50 projects beyond an outer wall of housing 12 of pressure measuring module 10 provided according to the present invention. As may also be seen in FIG. 3, pressure measuring chip 20 is electrically connected via bonding wires 24 to lead frame 30 or the at least one printed circuit trace (cf. illustration according to FIG. 4). Lower side 34 of pressure measuring chip 20 is set onto the upper side of pedestal 18, in the specific embodiment of pressure measuring module 10 provided according to the present invention. Inner space 14, in which pedestal 18 and pressure measuring chip 20 are located within housing 12, is closed off by a cover 60, which is constituted in such a way that the pressure to be sensed is able to be recorded by pressure measuring chip 20.

A top view of the pressure measuring module 10 provided according to the present invention may be gathered from the illustration according to FIG. 4.

The illustration according to FIG. 4 shows that housing 12 has a section identified by reference numeral 54. Within section 54 there are electronic components 56, especially, in each case, two EMC capacitors 56 bridging printed circuit traces 50. Instead of the two electronic components 56 situated within section 54, which are preferably EMC capacitors, one may also install a number of electronic components 56 that deviates from the number shown. From the top view of FIG. 4 it may be seen that upper plane side 22 of pressure measuring chip 20 is connected to contacting pads 52 by a number of bonding wires 24. Contacting pads 52, in turn, are connected to printed circuit traces 50, that are shown only partially in the top view in FIG. 4, and pass through housing 12 of pressure measuring module 10 provided according to the present invention. Sealing 60, shown in FIGS. 1, 2 and 3, of inner space 14 of pressure measuring module 10, is left out in top view 58 of FIG. 4, because of the graphic difficulty of showing it. Pressure measuring chip 20 shown in top view 58 is accommodated on pedestal 18 which is, however, not reproduced in top view 58 according to FIG. 4, because it is covered by the area dimensions of pressure measuring chip 20.

The design of pressure measuring module 10 provided according to the present invention, described above in connection with the specific embodiments according to FIGS. 1 to 4, having electronic components, that are integrated in it and especially are enclosed by a passivating medium 26, such as, for example, EMC capacitors 28, 56, makes it possible to increase the resistance of pressure measuring module 10 to electromagnetic interference (EMV) by using pressure measuring chips 20 that are already present and have proven themselves. At the same time, because of the design approach provided according to the present invention, the design of pressure measuring module 10 is simplified considerably and conceptualized to be more flexible.

The design of the pressure measuring module explained with reference to FIGS. 1 to 4, having integrated electronic components, such as at least one EMC capacitor 28, 56, has the very sound advantage over capacitors, integrated on pressure measuring chip 20, that the area of the pressure measuring chip 20 is able to be made less, and thus lower chip costs are generated, based on electronic components 28 integrated into housing 12, especially EMC capacitors integrated into housing 12. In addition, it has turned out that the capacitors integrated into the pressure measuring chip generally do not satisfy the ESD requirements, that is, the requirements placed upon electrostatic discharges. In addition, the design approach, provided according to the present invention, of integration of electronic components 28, especially at least one EMC capacitor 28, into housing 12, offers the advantage of achieving lower production costs and particularly that no new development of a pressure measuring chip 20 is required.

The design approach provided according to the present invention, for pressure measuring module 10, has the advantage over a variant in which at least one EMC capacitor was accommodated in a non-pressurized chamber and was glued onto the lead frame, that an improvement of the electromagnetic compatibility can be implemented by there being a substantially lesser distance between the at least one electronic component, especially the at least one EMC capacitor 28, 56 and pressure measuring chip 20. More flexible design variants are possible since the at least one electronic component 28, which is especially developed as EMC capacitor 28, 56, does not have to be accommodated externally but may be integrated into housing 12. This allows one to implement a considerable simplification in the production of pressure measuring module 10 since, for example, setting-on, adhesive and curing processes may be omitted. In the case of integration of electronic components 28, 56, which are preferably EMC capacitors, the second chamber that is present in a two-chamber module may be utilized, for instance, for accommodating additional ESD-EMC protective measures. Thus, in a two-chamber design, varistors and more of the like may be accommodated in the second chamber, that is otherwise used for accommodating the capacitors.

As was mentioned above with reference to the specific embodiments according to FIGS. 1 and 2, pressure measuring module 10 provided according to the present invention may be produced by several production methods:

Thus, for example, electronic components 28, 56, that are preferably present as EMC capacitors, may be preassembled on lead frame 30 or the at least one printed circuit trace 50. The preassembly takes place by developing a continuous material connection, such as by soldering or glueing using a conductive epoxy adhesive. The preassembled subassembly, thus obtained, of lead frame or printed circuit traces 50 and at least one electronic component 28, 56, is subsequently extrusion coated with the housing material of housing 12. Actual housing 12 is obtained by way of the extrusion coating of the preassembled component. This extrusion does not represent a separate production step. The preassembled subassembly is sealed from outer media by the extrusion coating.

In one possible alternative production method, housing 12 of pressure measuring module 10 provided according to the present invention may first be extruded to completion. There then follows the assembly of the at least one electronic component 28 on lead frame 30 using a continuous material method. For this purpose, soldering and glueing using a conductive epoxy adhesive are good, but so is soldering and bonding using a thin bonding wire. In this alternative production method, the at least one electronic component may also be subsequently mounted in a backfill region 46, that is, in a recess accessible from the rear of housing 12.

Figure 5:
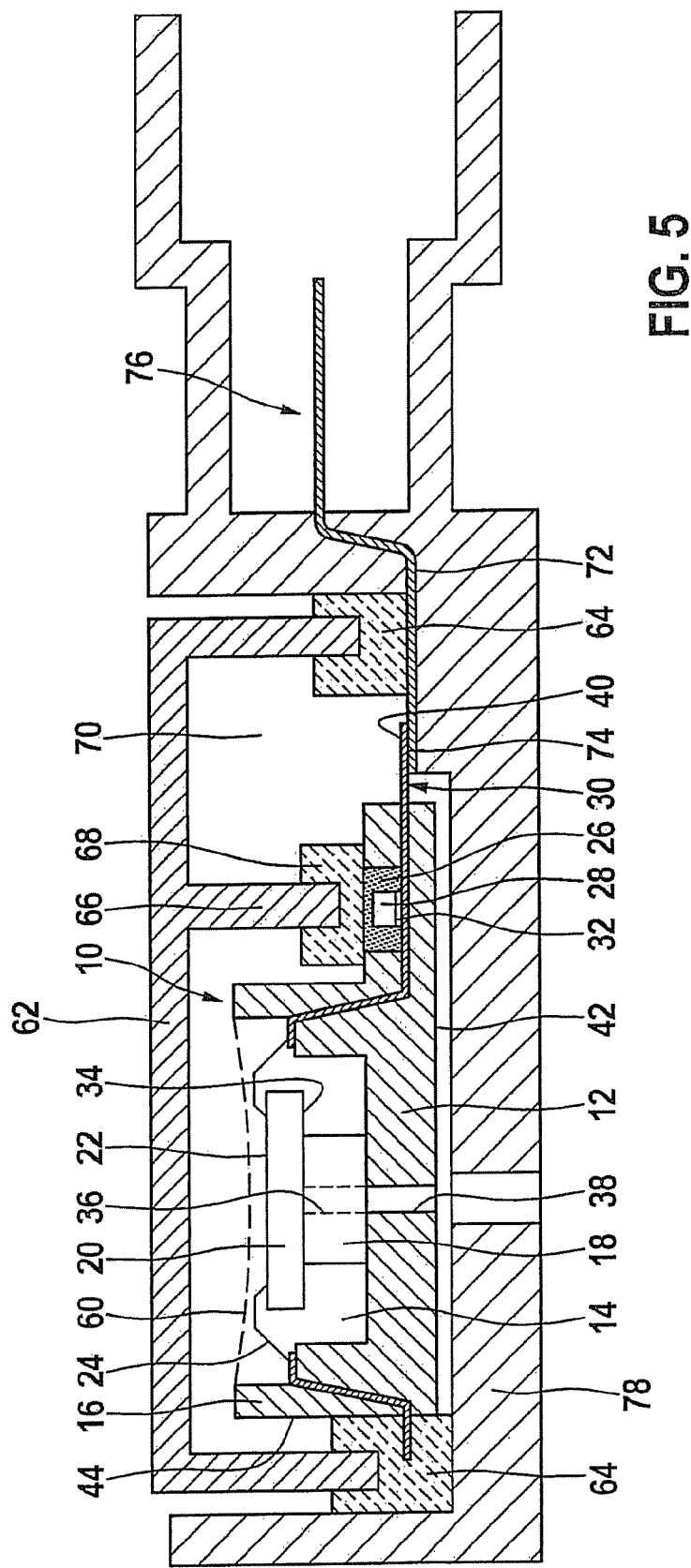
FIG. 5 shows a pressure measuring module in a sectional representation, having an EMC capacitor encapsulated by a partition.

FIG. 5 shows an embodiment variant of a pressure measuring module having an EMC capacitor that is encapsulated by a partition.

As shown in FIG. 5, housing 12, produced as a premold, which in its inner chamber 14 has pressure measuring chip 20 situated on pedestal 18, is on its part inserted into a plastic tub 78. Plastic tub 78 is closed by a cover 62. The cover is injected into embeddings 64, so that housing 12, produced as a premold, is encapsulated from the environment. Pressure measuring chip 20, situated in inner chamber 14 of housing 12, that is produced as a premold, is exposed to the environmental pressure via a pass-through channel 38, which passes through housing 12 produced as a premold, and via a pass-through channel 36 which passes through pedestal 18, as well as via an opening developed in plastic tub 78.

As was indicated in the embodiment variants according to FIG. 2, lead frame 30 is equipped with at least one electronic component, preferably an EMC capacitor 28. The at least one electronic component 28 is surrounded by a passivation 26, and is connected via a soldering connection or an epoxy adhesive connection 32 to an outgoing feeder of lead frame 30, or at least one printed circuit trace 50.

By contrast to the embodiment variant according to FIG. 2, by which a relative pressure may also be recorded, in the embodiment variant, shown in FIG. 5, of the pressure measuring module provided according to the present invention, there is located at least above the at least one electronic component 28, and perhaps above its passivation 26, a cover 68 that is configured like a stamp. In the specific embodiment shown in FIG. 5, cover 68 is developed as a continuation of a partition of cover 62 designed, for example, as intermediate wall 66.

As may be seen in the sectional representation according to FIG. 5, the inside of cover 62 is subdivided into two chambers by partition 66 developed especially as an intermediate wall. One of the chambers of cover 62, whose edges are taken up in embeddings 64 in plastic tub 78, covers housing 12 that is made as a premold, while the other chamber 70 is free of built-in items. In chamber 70 of cover 62, a connecting location 74 is located between lead frame 30 or the at least one printed circuit trace 50, leaving housing 12, that is made as a premold, and a lead frame or a printed circuit trace extension, cf. position 72 in FIG. 5.

An open end of lead frame extension 72 projects into a connecting region 76 on plastic tub 78.

Furthermore, as shown in FIG. 5, pressure measuring chip 20 is exposed to the environmental pressure via an opening in plastic housing 78, which is aligned with pass-through channel 38 and pass-through channel 36.

The at least one electronic component 28, which is connected to lead frame 30 or the at least one printed circuit trace 50 via soldering connection 32 or epoxy glueing connection 32, is preferably an EMC capacitor or the like.

What is claimed is:

1. A pressure measuring module for recording an absolute pressure or a relative pressure, comprising:
   a housing having an inner chamber;
   a pressure measuring chip accommodated in the inner chamber of the housing, a plane surface of the pressure measuring chip being contacted electrically via a bonding wire to a free end of at least one printed circuit trace in the inner chamber or to a free end of a lead frame in the inner chamber, on which at least one electronic component is accommodated; and
   a cover covering the inner chamber, wherein the at least one electronic component is mounted in a recess of the housing accessible from a back side of the housing facing away from the inner chamber and connected to a side of the free end of the lead frame or of the free end of the at least one printed circuit trace facing away from the bonding wire in the inner chamber, and the covered by a partition of the cover.

2. The pressure measuring module as recited in claim 1, wherein the at least one electronic component is adhered using an epoxy conductive adhesive to the lead frame or the at least one printed circuit trace.

3. The pressure measuring module as recited in claim 1, wherein the at least one electronic component is soldered or glued to the lead frame or the at least one printed circuit trace.

4. The pressure measuring module as recited in claim 1, wherein the at least one electronic component is soldered and bonded to the lead frame or the at least one printed circuit frame.

5. The pressure measuring module as recited in claim 1, wherein the at least one electronic component is connected by continuous material to the lead frame or the at least one printed circuit trace.

6. The pressure measuring module as recited in claim 5, wherein the at least one electronic component is soldered or fastened to the lead frame or the at least one printed circuit trace using an epoxy adhesive.

7. The pressure measuring module as recited in claim 5, wherein the at least one electronic component is soldered and bonded to the lead frame or the at least one printed circuit trace.

8. The pressure measuring module as recited in claim 5, wherein the at least one electronic component is accommodated in a medium for passivation, the passivation being glueing or gelling.

9. The pressure measuring module as recited in claim 1, wherein the housing developed as a premold.

10. The method for producing a pressure measuring module, the pressure measuring module including a housing and a pressure measuring chip, the method comprising:
   a) extruding the housing to completion;
   b) mounting in a region of the housing accessible from a back side, subsequent to step a), at least one electronic component using a continuous material joining method, on a lead frame or at least one printed circuit trace; and
   c) passivating the at least one electronic component by gelling or glueing.

11. The method as recited in claim 10, wherein the at least one electronic component joined is connected using a soldering connection, a conductive epoxy adhesive or by soldering and bonding to the lead frame or the at least one printed circuit trace.

* * * * *